(12) United States Patent
Miyoshi

(10) Patent No.: US 10,416,936 B1
(45) Date of Patent: Sep. 17, 2019

(54) IMAGE FORMING APPARATUS AND IMAGE FORMING METHOD

(71) Applicant: TOSHIBA TEC KABUSHIKI KAISHA, Shinagawa-ku, Tokyo (JP)

(72) Inventor: Nobuyuki Miyoshi, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/029,039

(22) Filed: Jul. 6, 2018

(51) Int. Cl.
*G06F 3/12* (2006.01)
*H04W 4/02* (2018.01)
*H04B 17/318* (2015.01)

(52) U.S. Cl.
CPC .......... *G06F 3/1221* (2013.01); *G06F 3/1231* (2013.01); *H04B 17/318* (2015.01); *H04W 4/023* (2013.01); *G06F 3/1292* (2013.01)

(58) Field of Classification Search
CPC .... G06F 3/1221; G06F 3/1231; G06F 3/1292; H04W 4/023; H04B 17/318
USPC ......................................................... 358/1.14
See application file for complete search history.

(56) References Cited

U.S. PATENT DOCUMENTS

| 6,738,628 | B1 * | 5/2004 | McCall | G01S 1/68 340/8.1 |
| 7,106,468 | B2 | 9/2006 | Jinbo et al. | |
| 2002/0054330 | A1 * | 5/2002 | Jinbo | G06F 3/1221 358/1.15 |
| 2018/0019829 | A1 * | 1/2018 | Oyama | H04B 17/30 |

* cited by examiner

*Primary Examiner* — Neil R McLean
(74) *Attorney, Agent, or Firm* — Foley & Lardner LLP

(57) ABSTRACT

An image forming apparatus includes a state control unit, a position information acquisition unit, and a power control determination unit. The state control unit controls the image forming apparatus in at least a normal state and a power saving state. The position information acquisition unit determines position information of a mobile terminal, based on a signal strength in wireless communication that is performed between the mobile terminal and a radio device disposed at a predetermined position. The power control determination unit determines whether or not to change a control state from the power saving state to the normal state, based on the position information of the mobile terminal that issues a printing instruction. The state control unit changes the control state from the power saving state to the normal state, according to a determination result of the power control determination unit.

15 Claims, 13 Drawing Sheets

| IDENTIFICATION INFORMATION OF PRINTING INSTRUCTION APPARATUS | IDENTIFICATION INFORMATION OF MOBILE TERMINAL | IDENTIFICATION INFORMATION OF USER |
|---|---|---|
| PC1 | Mobile1 | ○○ |
| PC1 | Mobile2 | ○○ |
| PC2 | Mobile3 | △△ |
| PC3 | Mobile4 | ×× |
| ⋮ | ⋮ | ⋮ |

FIG. 5
| ACQUISITION TIME | SIGNAL STRENGTH |
|---|---|
| 2018/01/29/01:15:27 | 60 |
| 2018/01/29/01:15:30 | 70 |
| 2018/01/29/01:15:33 | 80 |
| ⋮ | ⋮ |
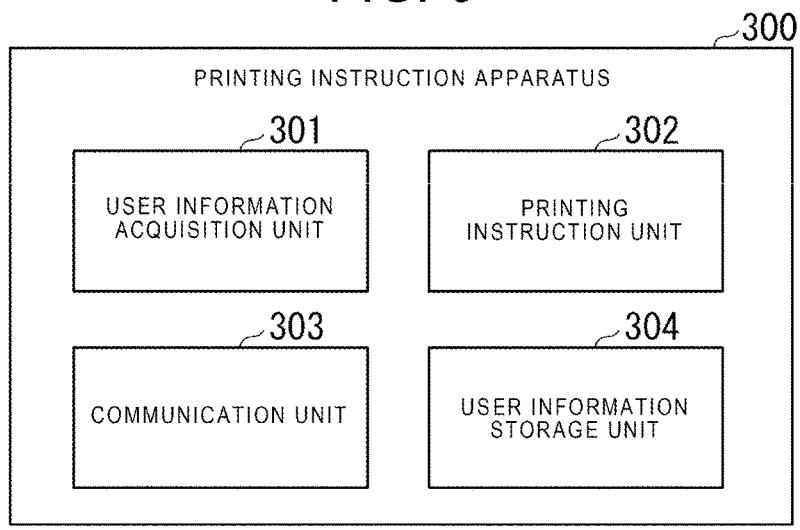
FIG. 6
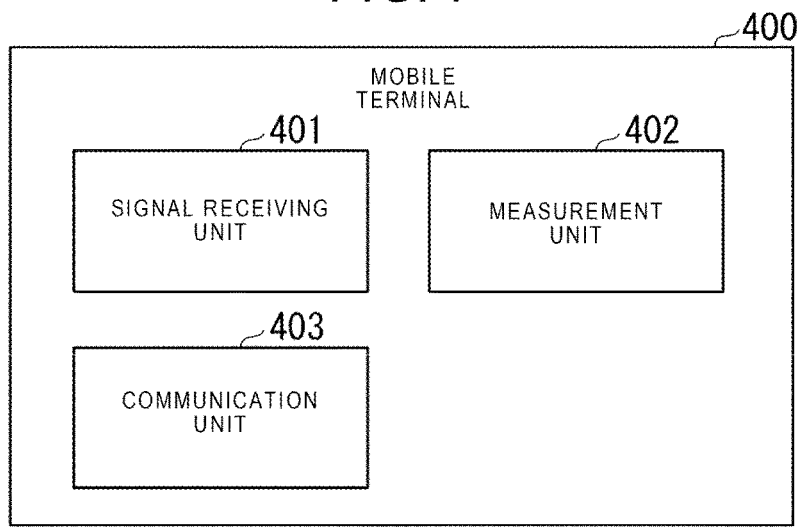
FIG. 7

| ACQUISITION TIME | SIGNAL STRENGTH OF RADIO DEVICE A | SIGNAL STRENGTH OF RADIO DEVICE B | SIGNAL STRENGTH OF RADIO DEVICE C | ... |
|---|---|---|---|---|
| 2018/01/29/01:15:27 | 210 | 150 | 120 | ... |
| 2018/01/29/01:15:30 | 225 | 162.5 | 110 | ... |
| 2018/01/29/01:15:33 | 240 | 175 | 100 | ... |
| ⋮ | ⋮ | ⋮ | ⋮ | ⋮ |

IMAGE FORMING APPARATUS AND IMAGE FORMING METHOD

FIELD

Embodiments described herein relate generally to an image forming apparatus and an image forming method.

BACKGROUND

In a multifunctional peripheral (MFP), if an operation is not performed for a long time, a state is shifted from a normal state to a power saving state. The normal state is a state in which an operation can be performed. The power saving state is a state in which an apparatus is in a standby state with reduced power consumption. If a predetermined condition such as a state where an operation is performed is satisfied, the MFP returns from the power saving state to the normal state.

In the related art, the MFP performs determination using a human sensor as the predetermined condition when returning from the power saving state to the normal state. The human sensor detects a person who is within a detection range and informs the MFP that the person is detected. However, the human sensor detects unspecified persons who are within the detection range. Accordingly, even if a person who actually does not perform an operation such as printing in the MFP is detected, the MFP shifts from the power saving state to the normal state. Thereby, wasteful power consumption may occur in a returning method in which the human sensor of the related art is used.

BRIEF DESCRIPTION OF THE DRAWINGS

FIG. 5 is a specific example of data stored in a signal strength storage unit according to the first embodiment.

FIG. 6 is a block diagram illustrating functions of a printing instruction apparatus according to the first embodiment.

FIG. 7 is a block diagram illustrating functions of a mobile terminal according to the first embodiment.

DETAILED DESCRIPTION

In general, according to at least one embodiment, an image forming apparatus includes a state control unit, a position information acquisition unit, and a power control determination unit. The state control unit controls the image forming apparatus in any one of a plurality of apparatus states including at least a normal state which is a printable state and a power saving state which is an unprintable state and in which power consumption is lower than power consumption in the normal state. The position information acquisition unit determines position information of a mobile terminal which is carried by a user, based on a signal strength in wireless communication that is performed between the mobile terminal and a radio device which is installed at a predetermined position. The power control determination unit determines whether or not to change a control state from the power saving state to the normal state, based on the position information of the mobile terminal that is carried by the user who issues a printing instruction, in the mobile terminal. The state control unit changes the control state from the power saving state to the normal state, according to a determination result of the power control determination unit.

Hereinafter, the image forming apparatus and an image forming method according to at least one embodiment will be described with reference to the drawings.

Figure 1:
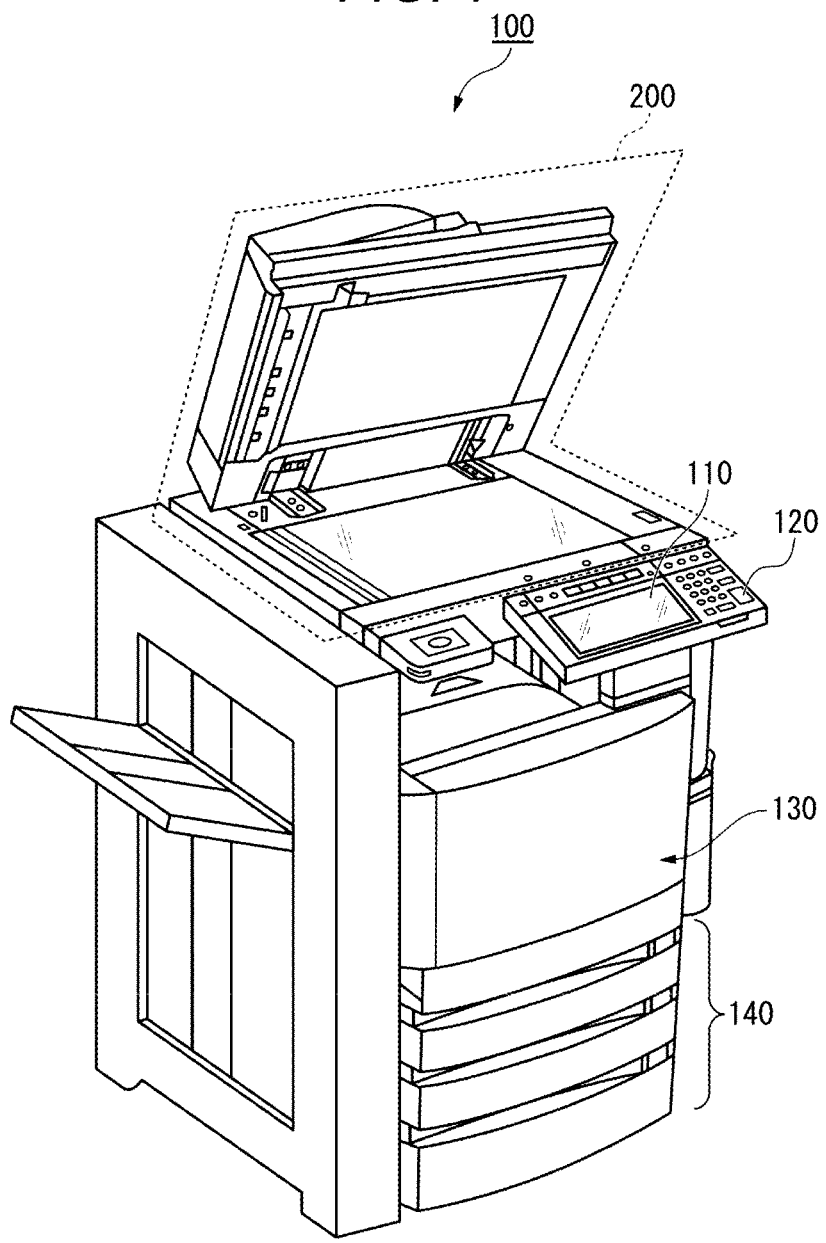
FIG. 1 is an external view illustrating the entire configuration example of an image forming apparatus according to at least one embodiment.

FIG. 1 is an external view illustrating the entire configuration example of an image forming apparatus 100 according to an embodiment. The image forming apparatus 100 is, for example, a multifunction peripheral. The image forming apparatus 100 includes a display 110, a control panel 120, a printer 130, a sheet containing unit 140, and an image reading unit 200. The printer 130 of the image forming apparatus 100 may be an apparatus that fixes a toner image or may be an apparatus of an ink jet type.

The image forming apparatus 100 forms an image on a sheet using a developer such as toner. The sheet may be, for example, paper or label paper. The sheet may be anything as long as the image forming apparatus 100 can form an image on a surface thereof.

The display 110 is an image display device such as a liquid crystal display or an organic electro luminescence (EL) display. The display 110 displays various types of information relating to the image forming apparatus 100.

The control panel 120 includes a plurality of buttons. The control panel 120 receives an input corresponding to an operation performed by a user. The control panel 120 outputs a signal corresponding to the operation performed by the user to a control unit of the image forming apparatus 100. The display 110 and the control panel 120 may be configured as an integral touch panel.

The printer 130 forms an image on a sheet, based on image information generated by the image reading unit 200 or image information received via a communication path. The printer 130 forms an image through, for example, the following processing. An image forming unit of the printer 130 forms an electrostatic latent image on a photoconductive drum, based on the image information. The image forming unit of the printer 130 forms a visible image by attaching the developer to the electrostatic latent image. A specific example of the developer is toner. A transfer unit of the printer 130 transfers the visible image onto the sheet. A fixing unit of the printer 130 fixes the visible image on the sheet by heating and pressurizing the sheet. The sheet on which an image is formed may be a sheet contained in the sheet containing unit 140 or may be a sheet held by hand.

The sheet containing unit 140 contains a sheet used for image formation in the printer 130.

The image reading unit 200 reads image information of a read target as light and shade of light. The image reading unit 200 records the read image information. The recorded image information may be transmitted to another information processing apparatus via a network. An image may be formed on a sheet by the printer 130, according to the recorded image information.

First Embodiment

Figure 2:
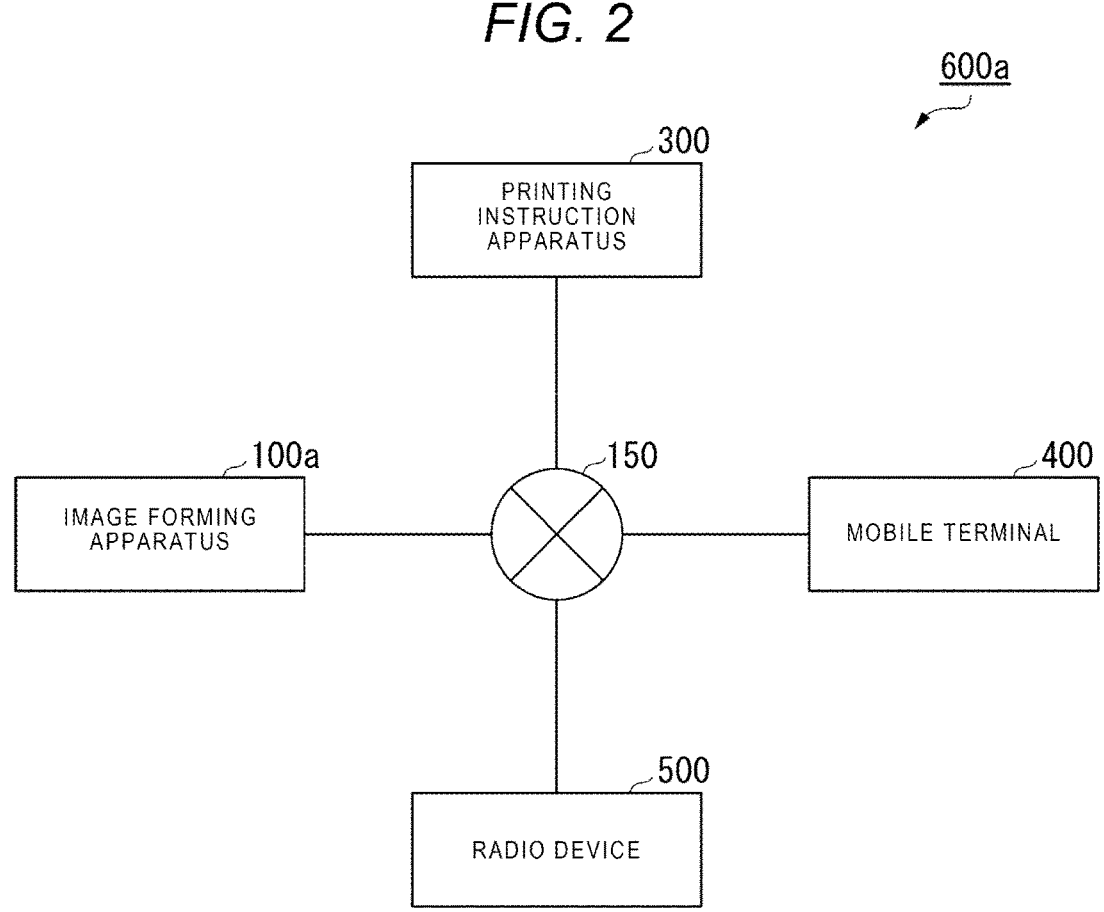
FIG. 2 is a system configuration diagram illustrating an outline of an image forming system according to a first embodiment.

FIG. 2 is a system configuration diagram illustrating an outline of an image forming system 600a according to a first embodiment. The image forming system 600a includes an image forming apparatus 100a, a printing instruction apparatus 300, a mobile terminal 400, and a radio device 500. The image forming apparatus 100a, the printing instruction apparatus 300, the mobile terminal 400, and the radio device 500 are connected to each other so as to be able to communicate via a network 150.

The network 150 is configured by using a network such as a local area network (LAN), a wide area network (WAN), or the Internet. The image forming apparatus 100a, the printing instruction apparatus 300, the mobile terminal 400, and the radio device 500 may be connected to the network 150 by a wire or may be connected wirelessly.

Figures 3, 4:
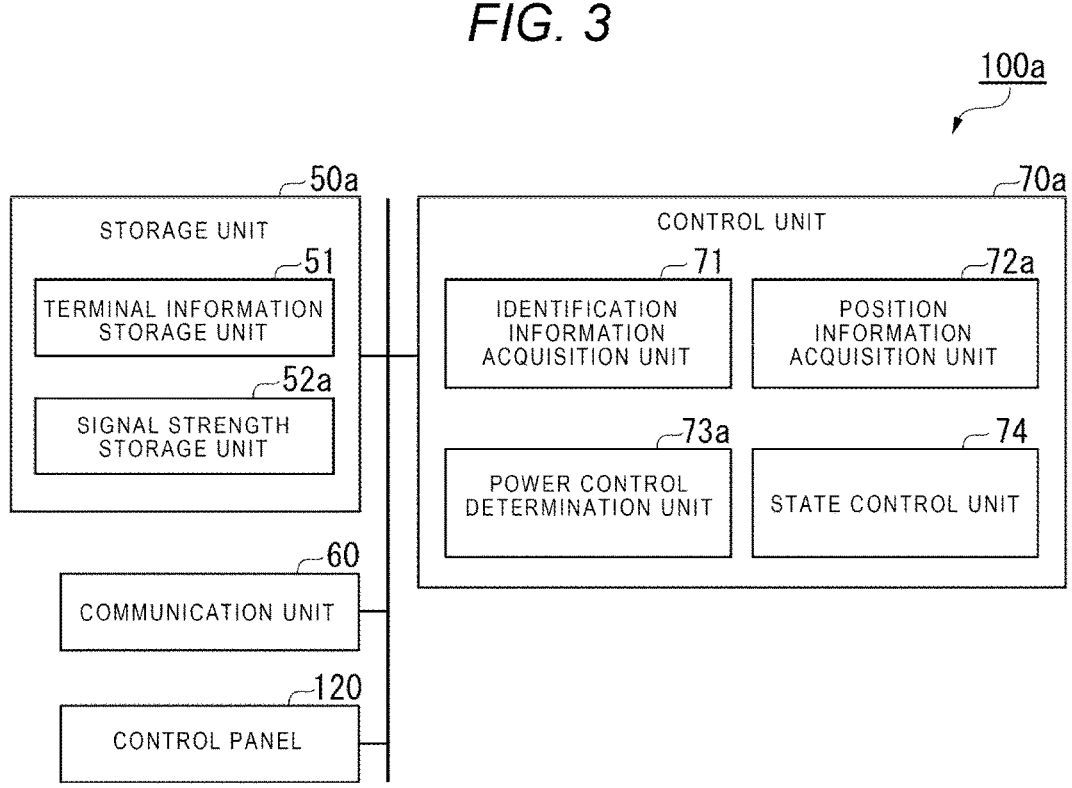
FIG. 3 is a block diagram illustrating functions of the image forming apparatus according to the first embodiment.
FIG. 4 is a specific example of data stored in a terminal information storage unit.

FIG. 3 is a block diagram illustrating functions of the image forming apparatus 100a according to the first embodiment. The image forming apparatus 100a includes a storage unit 50a, a communication unit 60, a control unit 70a, and a control panel 120.

The storage unit 50a is configured by using a storage device such as a magnetic hard disk device or a semiconductor memory device. The storage unit 50a functions as a terminal information storage unit 51 and a signal strength storage unit 52a.

The terminal information storage unit 51 stores identification information of the printing instruction apparatus 300, identification information of the mobile terminal, and identification information of a user in advance in association with each other.

The signal strength storage unit 52a stores a signal strength between the mobile terminal 400 and the radio device 500 and time when the signal strength is acquired.

FIG. 4 is a specific example of data stored in the terminal information storage unit 51. The terminal information storage unit 51 stores, for example, an identification information table illustrated in FIG. 4. The identification information table includes each data of the identification information of the printing instruction apparatus 300, the identification information of the mobile terminal 400, and the identification information of a user.

The identification information of the printing instruction apparatus 300 relates to the printing instruction apparatus 300 that notifies the image forming apparatus 100a of a printing instruction The identification information of the printing instruction apparatus 300 is, for example, an apparatus name or an OS name. In the following description, information relating to the printing instruction apparatus 300 is referred to as user information. The identification information of the printing instruction apparatus 300 is transmitted when the printing instruction apparatus 300 notifies the image forming apparatus 100a of the printing instruction. In FIG. 4, the apparatus name is used from among multiple pieces of the user information included in the printing instruction apparatus 300 as an example, but other identification information may be used.

The identification information of the mobile terminal 400 is information for identifying a mobile terminal correlated with the printing instruction apparatus 300 in advance. In FIG. 4, if the identification information of the printing instruction apparatus 300 is "PC1", data of "Mobile1" and "Mobile2" corresponding to "PC1" is stored in the identification information of the mobile terminal 400 in advance. In FIG. 4, a mobile terminal name is used for the identification information of the mobile terminal 400 as an example, but other identification information may be used as long as the mobile terminal 400 can be specified.

The identification information of a user is preset user information when the identification information of the printing instruction apparatus 300 is correlated with the identification information of the mobile terminal 400, The identification information of a user represents information for identifying a person such as a name and affiliation. In FIG. 4, a name of the user is used as an example, but other identification information may be used as long as the identification information can specify a person.

FIG. 5 is a specific example of data stored in the signal strength storage unit 52a according to the first embodiment. The signal strength storage unit 52a stores, for example, a table in which acquisition time and a signal strength are correlated with each other as illustrated in FIG. 5. The signal strength table includes each data of the signal strength acquired when communicating is performed between the mobile terminal 400 and the radio device 500, and the time when the signal strength is acquired. The signal strength table is provided, for example, for each user.

Referring back to the description of FIG. 3, the communication unit 60 is a communication interface. The communication unit 60 performs data communication with the printing instruction apparatus 300, the mobile terminal 400, and the radio device 500 via the network 150.

The control unit 70 is configured by using a processor such as a central processing unit (CPU). As the processor executes a program, the control unit 70 functions as an identification information acquisition unit 71, a position information acquisition unit 72a, a power control determination unit 73a, and a state control unit 74.

The identification information acquisition unit 71 acquires identification information of the printing instruction apparatus 300 from the printing instruction apparatus 300. The identification information acquisition unit 71 acquires identification information of the mobile terminal 400 and identification information of a user, which are correlated with the identification information, from the terminal information storage unit 51.

The position information acquisition unit 72a acquires a signal strength as position information from the mobile terminal 400, based on the identification information acquired by the identification information acquisition unit 71. Specifically, when the mobile terminal 400 receives a signal of the radio device 500, the signal strength between the mobile terminal 400 and the radio device 500 is acquired by a dedicated application. For example, the radio device 500 periodically transmits a signal with identification information indicating the radio device. By receiving a signal from the radio device 500, the mobile terminal 400 acquires the identification information added to the signal and a reception strength of the signal. The mobile terminal 400 transmits the acquired signal strength and identification information (radio device 500) and the identification information of the mobile terminal to the image forming apparatus 100a in association with each other. The position information acquisition unit 72a acquires the signal strength and the identification information radio device 500) transmitted in this way and the identification information of the mobile terminal 400 in association with each other. The position information acquisition unit 72a registers the acquired signal strength in a table of the signal strength corresponding to the acquired identification information of the mobile terminal as position information.

The power control determination unit 73a determines whether or not to change a control state from the power saving state to the normal state, based on the signal strength of the mobile terminal 400 and a threshold value for canceling the power saving state. The power control determination unit 73a determines whether or not the signal strength acquired by the position information acquisition unit 72a exceeds a threshold value for canceling the power saving state. The power control determination unit 73a passes the determination result to the state control unit 74 which will be described below. The threshold value of the signal strength for canceling the power saving state may be randomly determined.

The state control unit 74 shifts a state of the image forming apparatus 100a among a plurality of apparatus states. The apparatus states are a plurality of states with different power consumption. The apparatus states include, for example, a normal state and a power saving state. The normal state is a state in which image can be formed in response to an instruction from a user. The power saving state is a state in which power consumption is lower than in the normal state. In the power saving state, it takes a longer time than the normal state from when receiving an instruction of the user until forming an image. In the power saving state, for example, power supplied to a heater of a fixing unit is lower than in the normal state. The state control unit 74 controls return of the image forming apparatus 100a from the power saving state to the normal state, based on the determination result received from the power control determination unit 73a.

FIG. 6 is a block diagram illustrating functions of the printing instruction apparatus 300 according to the first embodiment. The printing instruction apparatus 300 includes a user information acquisition unit 301, a printing instruction unit 302, a communication unit 303, and a user information storage unit 304.

The user information acquisition unit 301 acquires the user information included in the printing instruction apparatus 300 from the user information storage unit 304 which will be described below.

When a printing job is issued, the printing instruction unit 302 notifies the image forming apparatus 100a of the printing instruction. When notifying the printing instruction, the printing instruction unit 302 notifies the image forming apparatus 100a of the user information acquired by the user information acquisition unit 301 together with the printing instruction.

The communication unit 303 is a communication interface. The communication unit performs data communication with the image forming apparatus 100a, the mobile terminal 400, and the radio device 500 via the network 150.

The user information storage unit 304 stores a device name included in the printing instruction apparatus 300, and the user information such as an OS name.

FIG. 7 is a block diagram illustrating functions of the mobile terminal 400 according to the first embodiment. The mobile terminal 400 includes a signal receiving unit 401, a measurement unit 402, and a communication unit 403.

The signal receiving unit 401 receives a signal transmitted from the radio device 500. The signal receiving unit 401 may be built in the mobile terminal 400 in advance, or may be mounted in an application or the like that receives an input from a user.

The measurement unit 402 measures a signal strength of a signal received from the radio device 500. The measurement unit 402 stores the measured signal strength in the signal strength storage unit 52a together with acquisition time.

The communication unit 403 is a communication interface. The communication unit 403 performs data communication with the image forming apparatus 100a, the printing instruction apparatus 300, and the radio device 500 via the network 150.

The mobile terminal 400 may issue a printing instruction to the image forming apparatus 100a instead of the printing instruction apparatus 300. In this case, when notifying the printing instruction, the communication unit 403 notifies the image forming apparatus 100a of the information of the mobile terminal 400. In addition, if the mobile terminal 400 is used instead of the printing instruction apparatus 300, the printing instruction apparatus 300 may be connected to the network 150 or may be disconnected.

Figure 8:
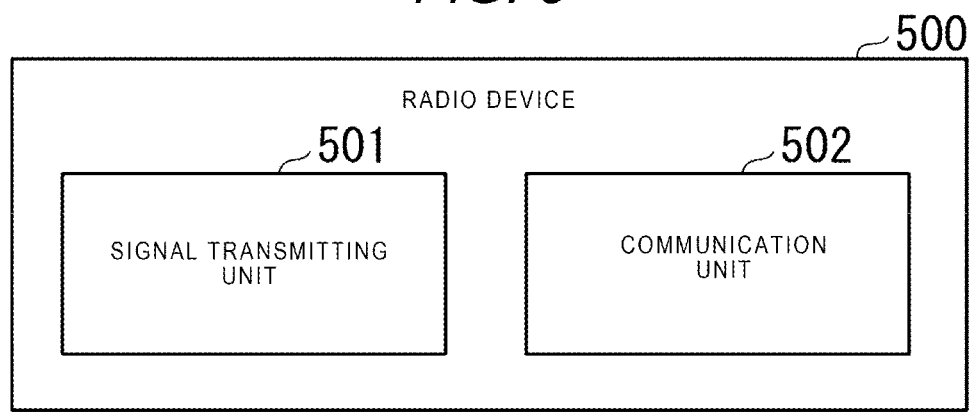
FIG. 8 is a block diagram illustrating functions of a radio device according to the first embodiment.

FIG. 8 is a block diagram illustrating functions of the radio device 500 according to the first embodiment. The radio device 500 includes a signal transmitting unit 501 and a communication unit 502.

The signal transmitting unit 501 transmits a signal to the mobile terminal 400. Timing when a signal is transmitted may be randomly determined.

The communication unit 502 is a communication interface. The communication unit 502 performs data communication with the image forming apparatus 100a, the printing instruction apparatus 300, and the mobile terminal 400 via the network 150.

It is preferable that the radio device 500 is installed in the image forming apparatus 100a or in the vicinity thereof. That is, it is preferable that a distance between the radio device 500 and the mobile terminal 400 indicates that a distance between the image forming apparatus 100a and the mobile terminal 400 is short.

Figure 9:
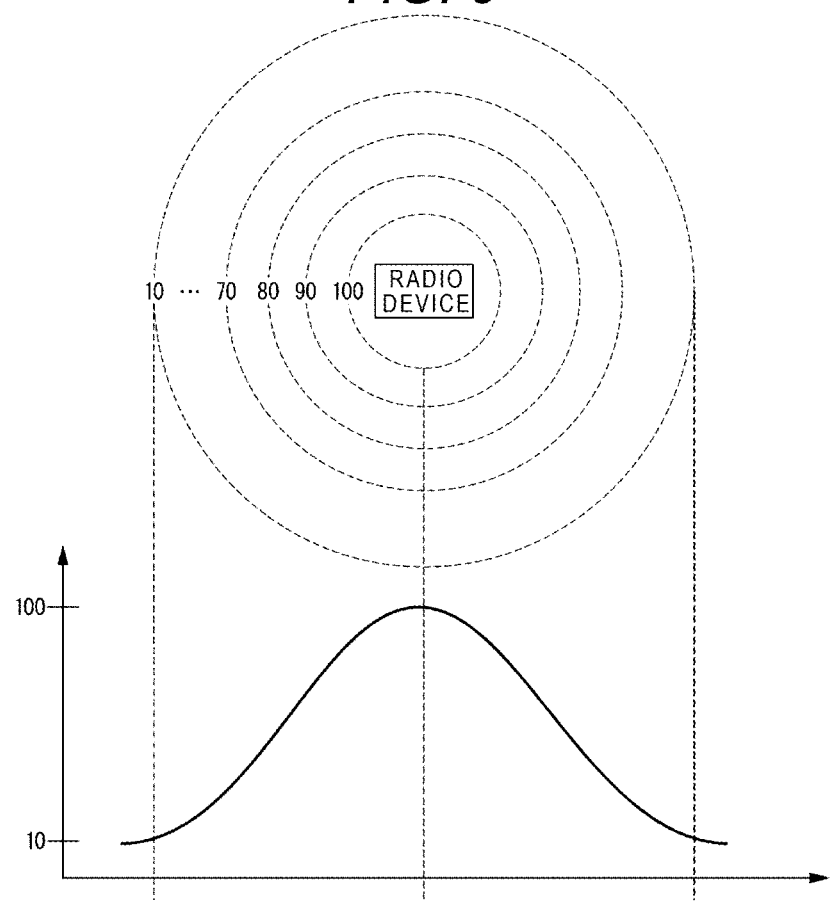
FIG. 9 is a graph illustrating a reception range and a signal strength of the radio device according to the first embodiment.

FIG. 9 is a graph illustrating the reception range and the signal strength of the radio device 500 according to the first embodiment. The radio device 500 concentrically transmits a signal from the signal transmitting unit 501 to the radio device 500. The above diagram (hereinafter, referred to as a "concentric diagram of a signal strength") illustrates the signal strengths viewed from above the radio device 500. The signal strength becomes greater as the distance to the radio device 500 decreases, and becomes less as the distance from the radio device 500 increases. In FIG. 9, it is assumed that the signal strength at a position close to the radio device 500 is 100, and the signal strength at a position distant from the radio device is 10, as an example. In addition, a signal strength actually measured may be set as the signal strength.

FIG. 9 (hereinafter, referred to as a "signal strength graph") illustrates an attenuation of the signal strength transmitted from the radio device 500 as a two-dimensional graph.

Next, a method of acquiring the signal strength will be described. In order to acquire the signal strength of the mobile terminal 400, a concentric figure of the signal strength and a graph of the signal strength are used. A user installs an application for measuring the signal strength in the mobile terminal 400 in advance. It the application receives a signal transmitted by the radio device 500, the mobile terminal 400 measures the received signal strength and notifies the position information acquisition unit 72*a*.

Figure 10:
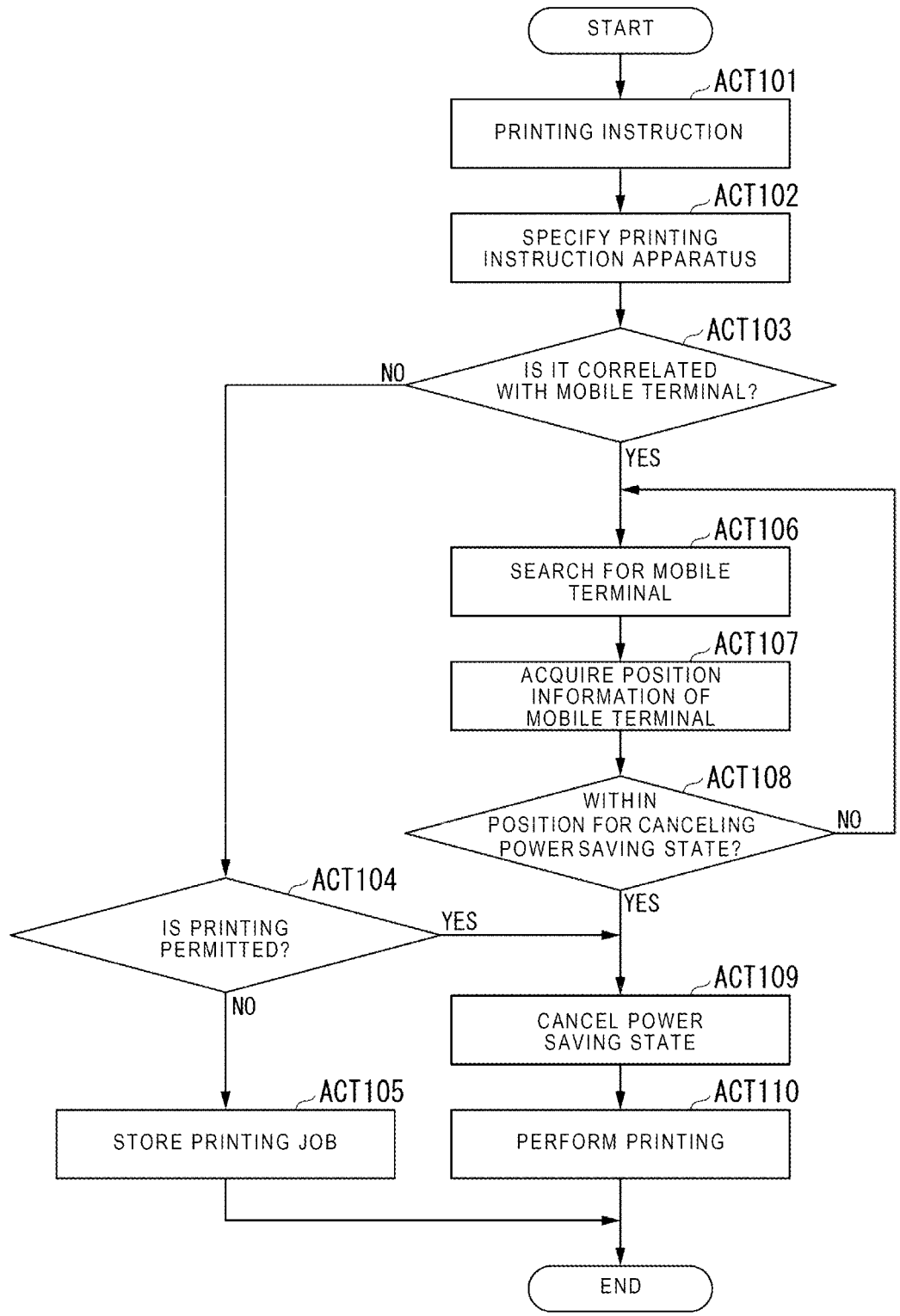
FIG. 10 is a flowchart illustrating a flow of return processing from a power saving state, according to the first embodiment.

FIG. 10 is a flowchart illustrating a flow of return processing from the power saving state, according to the first embodiment.

The printing instruction unit 302 of the printing instruction apparatus 300 notifies the image forming apparatus 100*a* of the printing instruction (ACT 101). The image forming apparatus 100*a* specifies the printing instruction apparatus 300, based on the user information received from the printing instruction apparatus 300 (ACT 102).

The image forming apparatus 100*a* search for the mobile terminal 400 correlated with the printing instruction apparatus 300 in advance, based on each identification information of the terminal information storage unit 51 (ACT 103).

If correlation between the mobile terminal 400 and the printing instruction apparatus 300 is not registered (ACT 103-NO), the printing instruction apparatus 300 requests a user whether or not to continue printing (ACT 104).

When the user permits continuation of printing (ACT 104-YES), the processing proceeds to ACT 108 which will be described below. Meanwhile, if the user does not permit the continuation of printing (ACT 104-NO), the image forming apparatus 100*a* stores a printing job (ACT 105) and ends the processing.

If correlation between the mobile terminal 400 and the printing instruction apparatus 300 is registered (ACT 103-YES), the position information acquisition unit 72*a* searches for the position information of the mobile terminal 400 (ACT 106). Next, the position information acquisition unit 72*a* acquires the signal strength measured by the measurement unit 402 as position information, based on the signal strength storage unit 52*a* (ACT 107).

The power control determination unit 73*a* determines whether or not the signal strength acquired by the position information acquisition unit 72*a* exceeds a threshold value for canceling the power saving state (ACT 108). If a value of the acquired signal strength does not exceed the threshold value for canceling the power saving state (ACT 108-NO), the processing is performed again from ACT 106.

If the value of the acquired signal strength exceeds the threshold value for canceling the power saving state (ACT 108-YES), the state control unit 74 cancels the power saving state. Specifically, the state control unit 74 changes power of the image forming apparatus 100*a* from the power saving state to the normal state. After a state is shifted from the power saving state to the normal state the image forming apparatus 100*a* executes the notified printing job (ACT 110).

According to the image forming system 600*a*, which is configured as described above, of the first embodiment, the return from the power saving state to the normal state is performed based on position information of the mobile terminal 400. Accordingly, the image forming apparatus 100*a* can quickly return from the power saving state to the normal state, and it is also possible to reduce power consumption.

Second Embodiment

Figure 11:
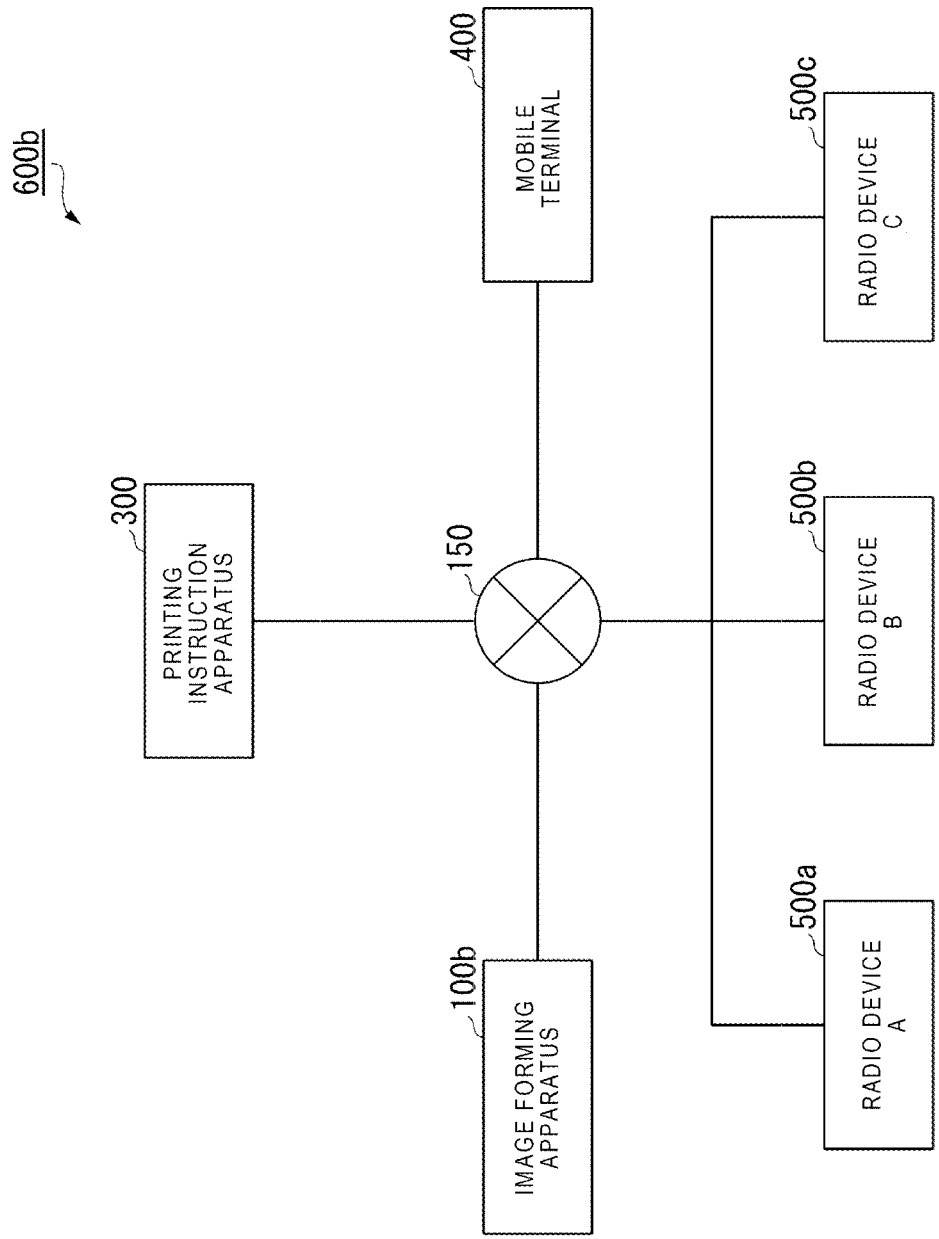
FIG. 11 is a system configuration diagram illustrating an outline of an image forming system according to a second embodiment.

FIG. 11 is a system configuration diagram illustrating an outline of an image forming system 600*b* according to a second embodiment. The image forming system 600*b* according to the second embodiment includes an image forming apparatus 100*b*, the printing instruction apparatus 300, the mobile terminal 400, and a plurality of the radio devices 500 (for example, 500*a*, 500*b*, and 500*c*)

The image forming system 600*b* is configured by mutually connecting the image forming apparatus 100*b*, the printing instruction apparatus 300, the mobile terminal 400, and the plurality of radio devices 500 via the network 150. The network 150 is configured by using a network such as LAN, WAN, or the Internet. In the example of FIG. 11, three radio devices 500 are used for the image forming system 600*b*. However, the number of radio devices 500 used for the image forming system 600*b* is not limited to the above-mentioned number.

Figures 12, 13:
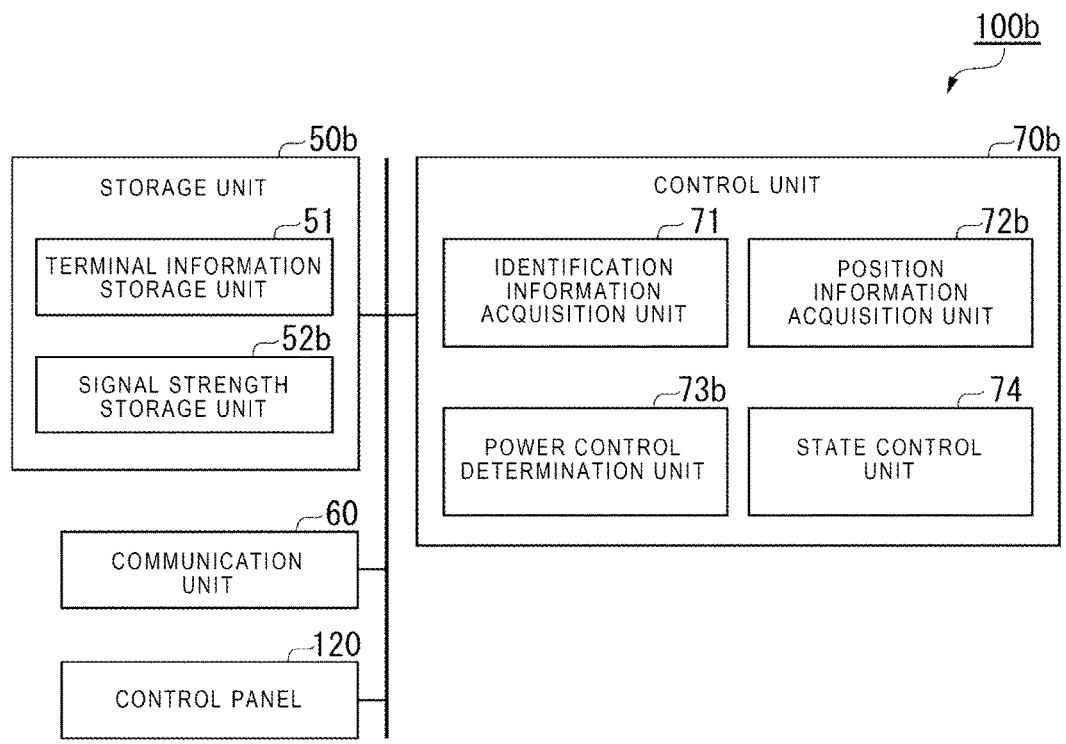
FIG. 12 is a block diagram illustrating functions of an image forming apparatus according to the second embodiment.
FIG. 13 is a specific example of data stored in a signal strength storage unit according to the second embodiment.

FIG. 12 is a block diagram illustrating functions of the image forming apparatus 100*b* according to the second embodiment. The image forming apparatus 100*b* includes a storage unit 50*b*, a communication unit 60, a control unit 70*b*, and a control panel 120. The communication unit 60 and the control panel 120 have the same configuration as the device of the same name in the first embodiment. Accordingly, description thereof will be omitted.

The storage unit 50*b* configured by using a storage device such as a magnetic hard disk device or a semiconductor memory device. The storage unit 50*b* functions as a signal strength storage unit 52*b*. The terminal information storage unit 51 has the same configuration as the device having the function of the same name in the first embodiment. Accordingly, description thereof will be omitted.

FIG. 13 is a specific example of data stored in the signal strength storage unit 52*b* according to the second embodiment. The signal strength storage unit 52*b* stores, for example, a table in which a plurality of signal strengths and acquisition times are correlated with each other as illustrated in FIG. 13. The signal strength table includes data of the signal strength acquired when communication is performed between the mobile terminal 400 and the plurality of radio devices 500 and times when the signal strengths are acquired.

The control unit 70*b* is configured by using a processor such as a CPU. As the processor executes a program, the control unit 70*b* functions as an identification information acquisition unit 71, a position information acquisition unit 72*b*, a power control determination unit 73*b*, and a state control unit 74. The identification information acquisition unit 71 and the state control unit 74 have the same configuration as the device having the function of the same name in the first embodiment. Accordingly, description thereof will be omitted.

The position information acquisition unit 72*b* acquires signal strengths as position information from the mobile terminal 400, based on the identification information acquired by the identification information acquisition unit 71. In addition, the position information acquisition unit 72*b* sets priorities based on distances to the image forming apparatus 100*b* in advance for each radio device, and assigns the priorities to the signal strengths. The position information acquisition unit 72*b* stores the signal strength (hereinafter, referred to as a "signal strength with priority") to which the priority is assigned in the signal strength storage unit 52*b*.

The position information acquisition unit 72*b* acquires the signal strengths for each radio device 500. Accordingly, the signal strength received from the radio device 500 at a first position is referred to as a first signal strength, the signal strength received from a second position closer to the image forming apparatus 100*b* than the first position is referred to as a second signal strength, . . . , and so on.

The power control determination unit 73*b* determines whether or not to change a control state from the power saving state to the normal state, based on the position information of the mobile terminal 400 and the position information for canceling the power saving state. Specifically, the power control determination unit 73*b* determines whether or not the signal strength with priority acquired by the position information acquisition unit 72*b* exceeds a threshold value for canceling power saving state. The power control determine unit 73*b* passes the determination result to the state control unit 74. The priority, the position information for canceling the power saving state, and the threshold value oaf the signal strength may be randomly determined.

Figure 14:
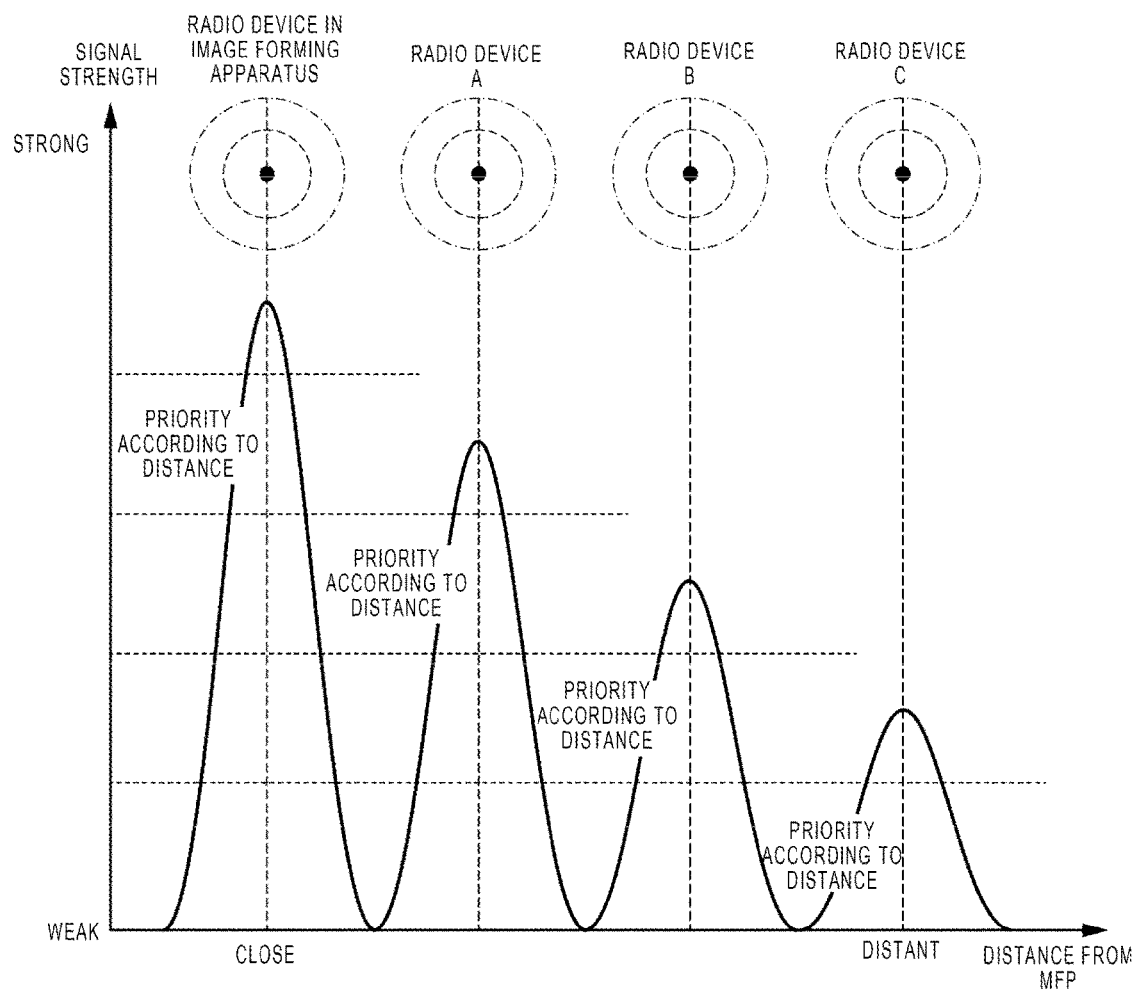
FIG. 14 is a graph illustrating a signal strength in which a reception range and a priority of a radio device according to the second embodiment is considered.

FIG. 14 is a graph illustrating signal strengths in which a reception range and a priority of the radio device 500 according to the second embodiment are considered. The radio device 500 concentrically transmits signals from the signal transmitting unit 501. A concentric diagram of the signal strengths illustrates the signal strengths viewed from above the plurality of radio devices 500. The signal strength is greater as the distance to the radio device 500 decreases, and is less as the distance from the radio device 500 increases.

The graph of the signal strengths is a two-dimensional graph illustrating the signal strengths transmitted from the plurality of radio devices 500. Priority is set based on the distances sequentially from the radio devices 500 closest to the image forming apparatus 100*b*. Specifically, the two-dimensional graph of FIG. 14 indicates that the radio device 500A is closer to the image forming apparatus 100*b* than the radio device 500B and the radio device 500C. In the same manner, the radio device 500B is more distant than the radio device 500A and is closer to the image forming apparatus 100*b* than the radio device C.

Figure 15:
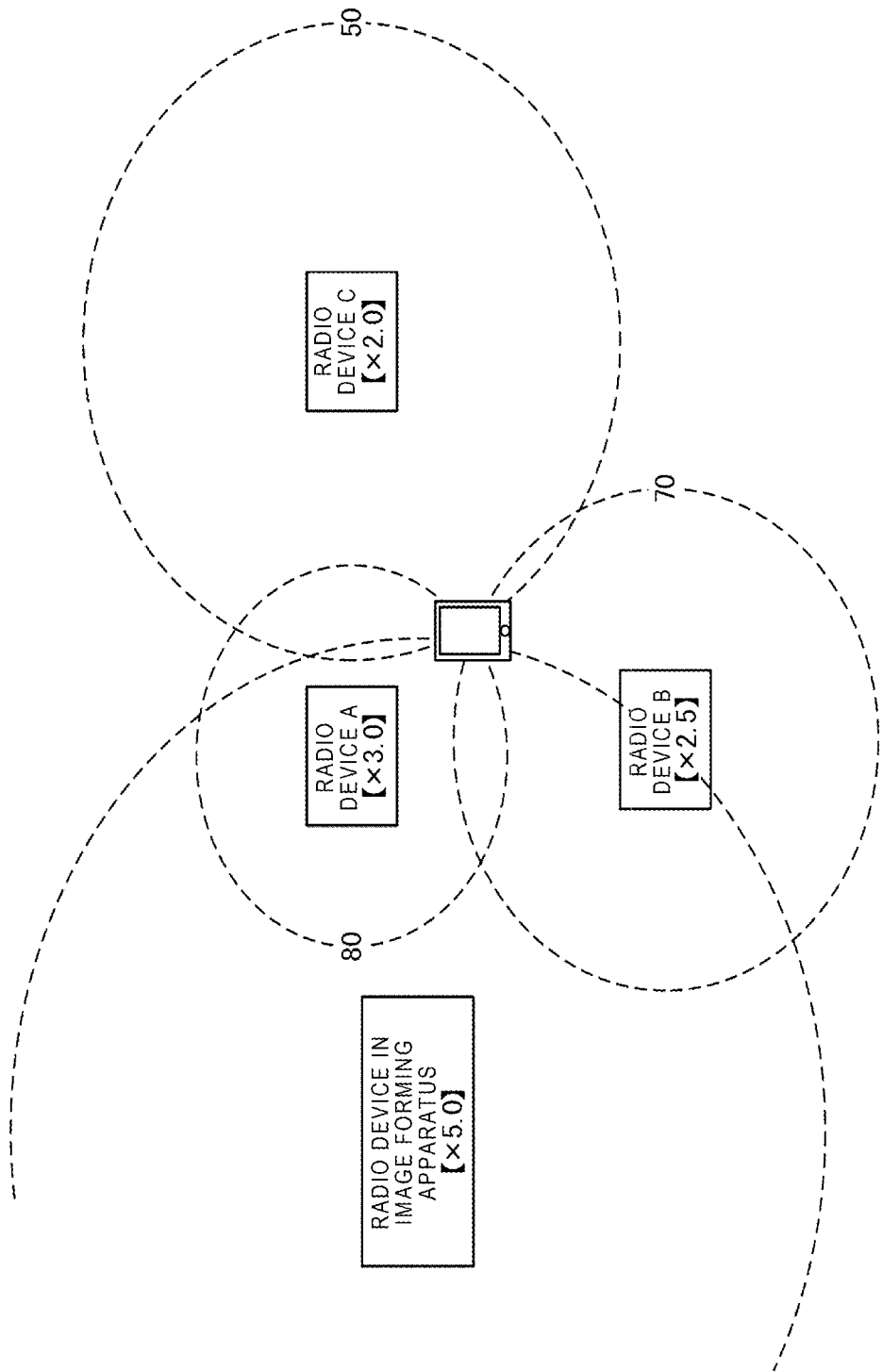
FIG. 15 is a diagram illustrating a method of measuring each signal strength in which a priority from the radio device to a mobile terminal is considered, according to the second embodiment.

FIG. 15 is a diagram illustrating a method of measuring signal strengths in consideration of the priorities from the radio devices 500 to the mobile terminal, according to the second embodiment.

The priority set in the radio device 500 is randomly set for each radio device 500, based on a distance from the image forming apparatus 100*b*. In the example of FIG. 15, the priority of the radio device in the image forming apparatus 100*b* is set to five times, the priority of the radio device 500 A is set to three times, . . . , and the like.

Next, the mobile terminal 400 measures the signal strength, based on the signal strengths received from each radio device 500, and based on the priorities set for each radio device 500. The mobile terminal 400 stores the measured signal strength with priority in the signal strength storage unit 52 *b*.

Figure 16:
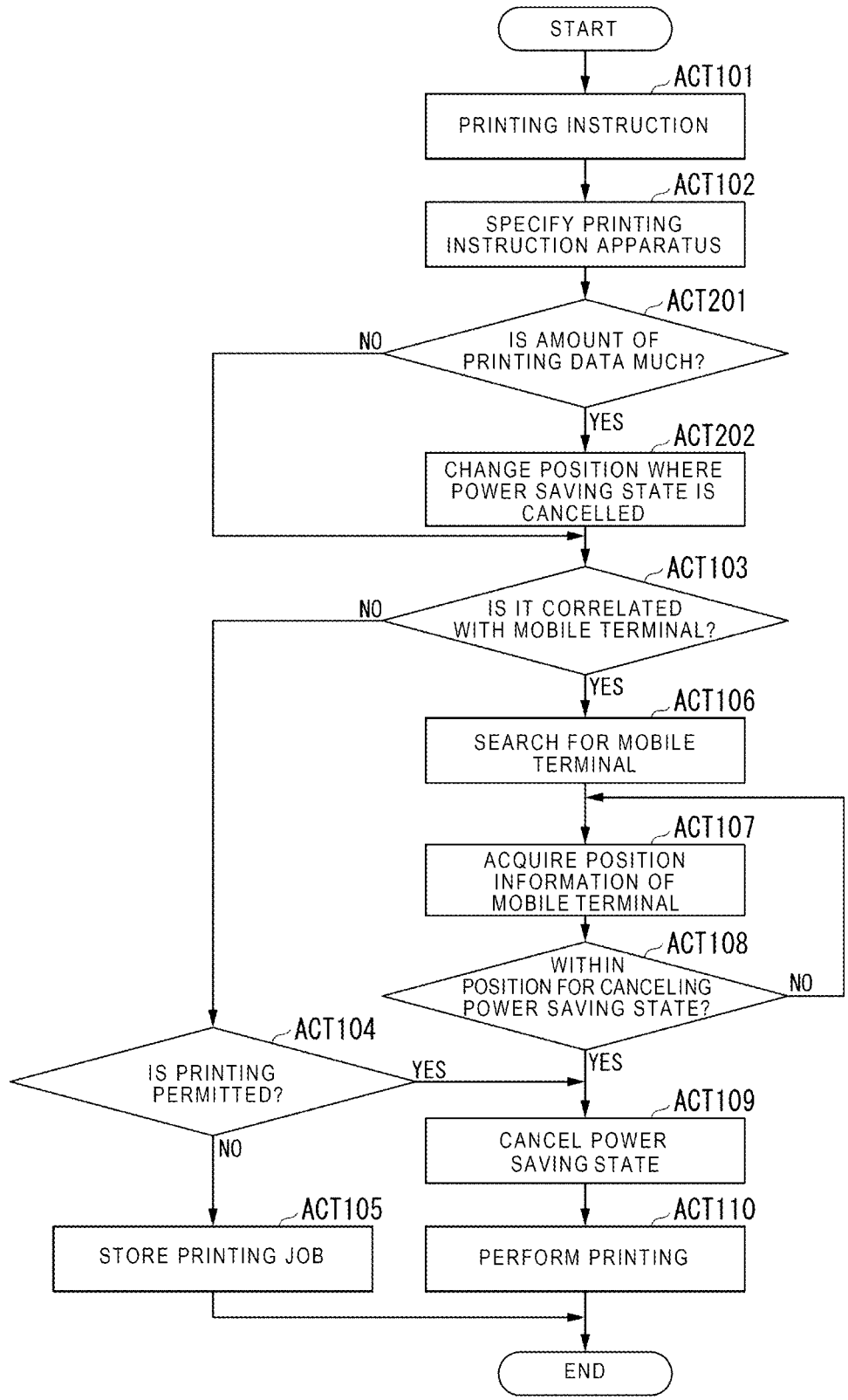
FIG. 16 is a flowchart illustrating a flow of return processing from a power saving state, according the second embodiment.

FIG. 16 is a flowchart illustrating a flow of the return processing from the power saving state according to the second embodiment. In FIG. 16, the same reference numerals are attached to the same processing as the processing illustrated in FIG. 10. In FIG. 16, Different codes (ACT 200 series numbers) are attached to processing not illustrated in FIG. 10. First, the processing of ACT 101 to ACT 102 is performed. Next, the identification information acquisition unit 71 determines whether or not a data capacity of the received printing job is large (ACT 201).

If the data capacity of the printing job is large (ACT 201-YES), it takes time to print and thus, the power control determination unit 73*b* lowers the threshold value for canceling the power saving state. Thereby, the image for apparatus 100*b* can change a control state from the power saving state to the normal state at an early stage, and it is possible to increase the printing time of a user. ACT 202 shifts to the next ACT 103, and thereafter, the processing of ACT 103 to ACT 110 is performed. If the data capacity of the printing job is large (ACT 201-YES), the processing proceeds to the next ACT 103, and the processing of ACT 103 to ACT 110 is performed.

In addition, according to the image forming system 600*b* of the second embodiment, returning from the power saving state to the normal state is performed based on the position information of the mobile terminal 400. At this time, since the plurality of radio devices 500 exist, the position information acquisition unit 72*b* can acquire the position information of the mobile terminal 400 in detail. Accordingly, the image forming apparatus 100*a* can quickly return from the power saving state to the normal state, and furthermore, it is also possible to reduce power consumption.

Modification Example

Figure 17:
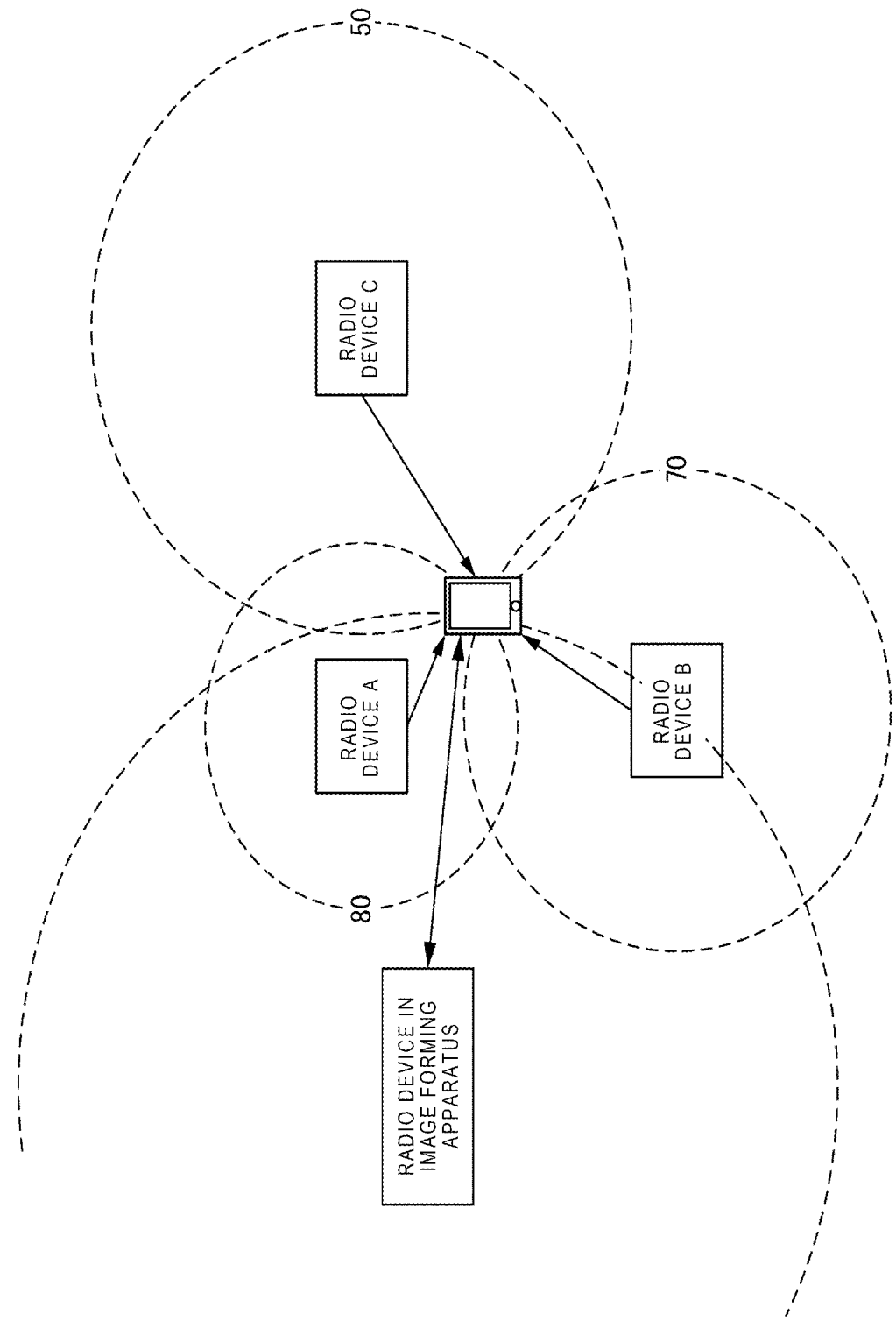
FIG. 17 a diagram illustrating a method of measuring a distance between the image forming apparatus and the mobile terminal, according to a modification example.

In a modification example according to the second embodiment, the position information acquisition unit 72*b* may use a distance as the position information. FIG. 17 is a diagram illustrating a method of measuring a distance between the image forming apparatus 100*b* and the mobile terminal 400, according to the modification example. The mobile terminal 400 measures distances between the respective radio devices 500 and the mobile terminal 400, based on the signal strengths received from at least three or more radio devices 500. The mobile terminal 400 measures a position of the mobile terminal by using a triangulation technique or the like, based on the information on the distance measured from each radio device 500 and on the information on a position of the radio device 500 previously determined. The mobile terminal 400 transmits the measured position information of the mobile terminal to the position information acquisition unit 72*b*. The position information acquisition unit 72*b* acquires a distance between the image forming apparatus 100*b* and the mobile terminal 400, based on the information on the position of the mobile terminal 400.

Next, the power control determination unit 73*b* determines whether or not to change a control state from the power saving state to the normal state, based on information on the distance between the mobile terminal 400 and the image forming apparatus 100*b* and a random distance for canceling the power saving state. Specifically, the power control determination unit 73*b* determines whether or not the distance acquired by the position information acquisition unit 72*b* exceeds a threshold value of a distance to cancel the power saving state. The power control determination unit 73*b* passes the determination result to the state control unit 74. The distance to cancel the power saving state may be randomly determined.

Figure 18:
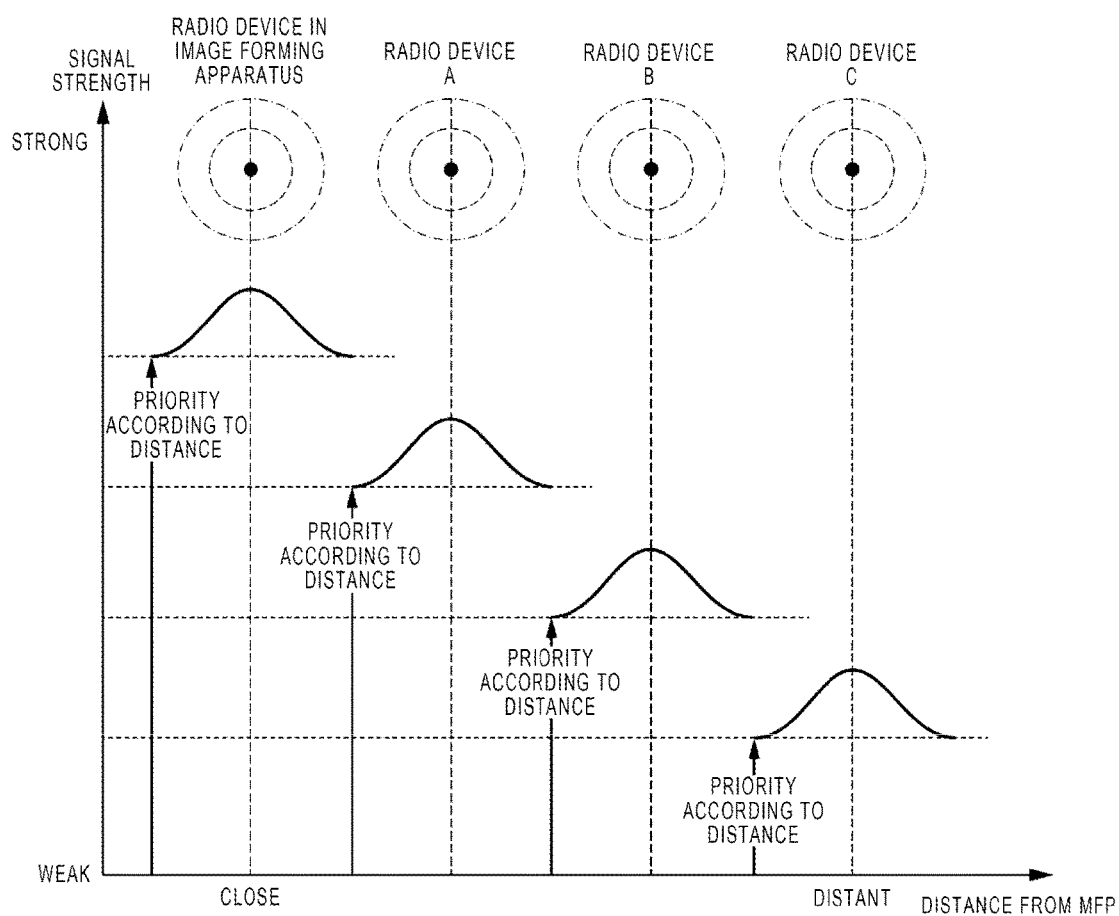
FIG. 18 is a graph illustrating a reception range and a signal strength of a radio device according to the modification example.

FIG. 18 is a graph illustrating a reception range and a signal strength of the radio device 500 according to the modification example. In FIG. 15, the signal strength with priority according to the distance is represented by multiplying the signal strength by the priority. In FIG. 18, the signal strength with priority according to the distance is represented by adding the signal strength to the priority. By adding priorities, the signal strength with priority in FIG. 18 is greater as the distance to the image forming apparatus 100 decreases, and is less as the distance from the image forming apparatus increases in the same manner as illustrated in FIG. 15. Accordingly, it is possible to acquire a first signal strength and the second signal strength in the same manner as in FIG. 15, even if the signal strength with priority of FIG. 18 is used.

The image forming apparatus 100 may include a user operation determination unit that determines how the mobile terminal 400 moves, based on the position information stored in the signal strength storage unit 52*a* by the position information acquisition unit 72*a*. Hereinafter, determining will be described.

The user operation determination unit determines a change in the signal strength of wireless communication between the mobile terminal 400 and the radio device 500, based on the data table stored in the signal strength storage unit 52*a*. If the signal strength increases with the lapse of time, the user operation determination unit determines that the mobile terminal 400 is approaching the image forming apparatus 100. If the signal strength decreases with the lapse of time, the user operation determination unit determines that the mobile terminal 400 is moving away from the image forming apparatus 100. If the signal strength is not changed even after random time elapses, the user operation determination unit determines that the mobile terminal 400 is stopped.

The determination result output by the user operation determination unit may be acquired as an item of the fourth position information, that is, as a movement direction of a user in addition to the signal strength, the signal strength with priority, and the distance. Thereby, even if the signal strength is great, when the user moves in a direction in which the movement direction of the user is distant from the image forming apparatus 100, the state control unit 74 can maintain the power saving state.

In the above-described embodiment, the image forming system 600 (600*a*, 600*b*) searches the position information of the mobile terminal 400 after the printing instruction apparatus 300 notifies the printing job. In this case, if the printing instruction apparatus 300 does not notify the printing job, the position information of the mobile terminal 400 is not acquired. Accordingly, a notification unit that transmits the same notification to the mobile terminal 400 is provided and the notification my be sent to the image forming apparatus 100.

In addition, the processing performed by the image forming apparatus 100, the processing performed by the printing instruction apparatus 300, the processing performed by the mobile terminal 400, and the processing performed by the radio device 500 may be shared in a mode different from the above-described mode. For example, at the time of ACT 103, corresponding comparison of devices may be performed by the mobile terminal 400 instead of image forming apparatus 100.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus comprising:
a processor configured to:
control the image forming apparatus in any one of a plurality of apparatus states including at least a normal state, which is a printable state, and a power saving state, which is an unprintable state and in which power consumption is lower than power consumption in the normal state;
determine position information of a mobile terminal which is carried by a user, based on a signal strength in wireless communication that is performed between the mobile terminal and at least one radio device which is disposed at a predetermined position; and
determine whether or not to change a control state from the power saving state to the normal state, based on the position information of the mobile terminal that is carried by the user who issues a printing instruction, in the mobile terminal,
wherein the processor is configured to change the control state from the power saving state to the normal state, according to a determination result of the processor,
wherein the at least one radio device includes a plurality of radio devices, and
wherein the predetermined positions of the radio devices include a first position and a second position that is closer to the image forming apparatus than the first position,
wherein the processor is configured to acquire position information of the mobile terminal, based on a first signal strength which is a signal strength in wireless communication that is performed between the radio device at the first position and the mobile terminal, and based on a second signal strength which is a signal strength in wireless communication that is performed between the radio device at the second position and the mobile terminal.

2. The apparatus according to claim 1,
wherein the predetermined position where the at least one radio device is disposed is a position of the image forming apparatus or a position close to the image forming apparatus.

3. The apparatus according to claim 2,
wherein the processor is configured to change the control state from the power saving state to the normal state when the signal strength in the position information exceeds a threshold value.

4. The apparatus according to claim 1,
wherein the processor is configured to acquire the position information by assigning a higher priority to the second signal strength than the first signal strength.

5. The apparatus according to claim 4,
wherein the processor is configured to change the control state from the power saving state to the normal state when the signal strength which is in the position information and has the priority exceeds a threshold value.

6. The apparatus according to claim 1, wherein the processor is configured to set priorities to the plurality of radio devices with higher priority set for a radio device as a distance from the radio device to the image forming apparatus becomes smaller,
the processor is configured to determine the position information based on a signal strength with priority for each of the plurality of radio devices, the signal strength with priority for each of the plurality of radio devices being based on the set priority and the signal strength.

7. The apparatus according to claim 6, wherein the processor is configured to change the control state from the power saving state to the normal state when the signal strength with priority for one of the plurality of radio devices exceeds a threshold value.

8. The apparatus according to claim 6, wherein the processor is configured to determine the signal strength with priority based on multiplying the set priority and the signal strength for each of the plurality of radio devices.

9. The apparatus according to claim 6, wherein the processor is configured to determine the signal strength with priority based on adding the set priority and the signal strength for each of the plurality of radio devices.

10. An image forming apparatus comprising:
a processor configured to:
control the image forming apparatus in any one of a plurality of apparatus states including at least a normal state, which is a printable state, and a power saving state, which is an unprintable state and in which power consumption is lower than power consumption in the normal state;
determine position information of a mobile terminal which is carried by a user, based on a signal strength in wireless communication that is performed between the mobile terminal and at least one radio device which is disposed at a predetermined position; and
determine whether or not to change a control state from the power saving state to the normal state, based on the position information of the mobile terminal that is carried by the user who issues a printing instruction, in the mobile terminal,
wherein the processor is configured to change the control state from the power saving state to the normal state, according to a determination result of the processor,
wherein at least three radio devices are disposed at different positions, and
wherein the processor is configured to acquire information on a position in a real space of the mobile terminal as position information, based on positions where the respective radio devices are disposed and a signal strength between the respective radio devices and the mobile terminal.

11. The apparatus according to claim 10,
wherein the processor is configured to change the control state from the power saving state to the normal state when a distance between a position in the real space and a position of the image forming apparatus becomes smaller than a threshold value.

12. An image forming method comprising:
acquiring position information of a mobile terminal which is carried by a user, based on a signal strength in wireless communication that is performed between the mobile terminal and at least one radio device which is disposed at a predetermined position;
determining whether or not to change a control state from a power saving state to a normal state, among a plurality of apparatus states including at least the normal state which is a printable state and the power saving state, based on position information of the mobile terminal that is carried by a user who issues a printing instruction, in the mobile terminal;
changing the control state of an image forming apparatus from the power saving state to the normal state according to a determination result,
wherein the predetermined position where the at least one radio device is disposed is a position of the image forming apparatus or a position close to the image forming apparatus,
wherein the at least one radio device includes a plurality of radio devices, and
wherein the predetermined positions of the radio devices include a first position and a second position that is closer to the image forming apparatus than the first position; and
acquiring the position information of the mobile terminal based on a first signal strength which is a signal strength in wireless communication that is performed between the radio device at the first position and the mobile terminal, and based on a second signal strength which is a signal strength in wireless communication that is performed between the radio device at the second position and the mobile terminal.

13. The method according to claim 12, further comprising:
changing the control state from the power saving state to the normal state when the signal strength in the position information exceeds a threshold value.

14. The method according to claim 12,
wherein the position information is acquired by assigning a higher priority to the second signal strength than the first signal strength.

15. The method according to claim 14, further comprising:
changing the control state from the power saving state to the normal state when the signal strength which is in the position information and has the priority exceeds a threshold value.

* * * * *